(12) United States Patent
Chen et al.

(10) Patent No.: US 9,030,504 B2
(45) Date of Patent: May 12, 2015

(54) DISPLAY PANEL AND METHOD OF DRIVING THE SAME

(75) Inventors: Yan-Ciao Chen, New Taipei (TW);
Yu-Sheng Huang, Kaohsiung (TW);
Chia-Lun Chiang, Keelung (TW);
Meng-Ju Tsai, Kaohsiung (TW)

(73) Assignee: Au Optronics Corporation, Hsinchu (TW)

( * ) Notice: Subject to any disclaimer, the term of this patent is extended or adjusted under 35 U.S.C. 154(b) by 398 days.

(21) Appl. No.: 13/352,357

(22) Filed: Jan. 18, 2012

(65) Prior Publication Data

US 2013/0120466 A1 May 16, 2013

(30) Foreign Application Priority Data

Nov. 14, 2011 (TW) .............................. 100141427 A

(51) Int. Cl.
*G09G 5/10* (2006.01)
*G09G 3/36* (2006.01)
*G02F 1/1343* (2006.01)

(52) U.S. Cl.
CPC .. *G09G 3/3659* (2013.01); *G02F 2001/134345* (2013.01); *G09G 3/3648* (2013.01); *G09G 2300/0447* (2013.01); *G09G 2300/0452* (2013.01); *G09G 2300/0814* (2013.01); *G09G 2300/0852* (2013.01); *G09G 2310/0283* (2013.01); *G09G 2320/028* (2013.01); *G09G 2320/068* (2013.01); *G09G 2358/00* (2013.01)

(58) Field of Classification Search
CPC ..... G02F 1/133; G02F 1/1335; G02F 1/1343; G02F 1/1362; G09G 3/36

USPC ....................................... 345/690, 204, 32, 87
See application file for complete search history.

(56) References Cited

U.S. PATENT DOCUMENTS

| 7,760,303 | B2 | 7/2010 | Jang et al. | |
|---|---|---|---|---|
| 8,482,503 | B2 * | 7/2013 | Song et al. ...................... | 345/94 |
| 2006/0267892 | A1 * | 11/2006 | Pei et al. ......................... | 345/88 |
| 2007/0030284 | A1 * | 2/2007 | Ogasawara et al. ........... | 345/589 |
| 2007/0126965 | A1 * | 6/2007 | Huang et al. ................... | 349/129 |
| 2008/0024689 | A1 | 1/2008 | Ahn | |

(Continued)

FOREIGN PATENT DOCUMENTS

CN 101916017 12/2010
TW I247936 1/2006

(Continued)

OTHER PUBLICATIONS

"First Office Action of China counterpart application" issued on Oct. 24, 2013, p. 1-p. 6.

*Primary Examiner* — Kent Chang
*Assistant Examiner* — Andrew Lee
(74) *Attorney, Agent, or Firm* — Jianq Chyun IP Office

(57) ABSTRACT

A driving method of a display panel is described. A display panel including a pixel array is provided. The pixel array includes N scan lines, M data lines, and a plurality of first pixel units and a plurality of second pixel units electrically connected to the scan lines and the data lines. When an image is displayed with a wide-viewing angle mode, a first scanning procedure is performed to sequentially scan the first scan line of the scan lines to the Nth scan line of the scan lines in order. When the image is displayed with a narrow-viewing angle mode, the second scanning procedure is performed to sequentially scan the Nth scan line of the scan lines to the first scan line of the scan lines in order.

19 Claims, 13 Drawing Sheets

(56) References Cited

U.S. PATENT DOCUMENTS

| | | | |
|---|---|---|---|
| 2008/0297539 A1* | 12/2008 | Kim et al. | 345/690 |
| 2009/0058777 A1* | 3/2009 | Cheng | 345/88 |
| 2009/0190074 A1* | 7/2009 | Woo et al. | 349/106 |
| 2009/0225247 A1* | 9/2009 | Yagi et al. | 349/39 |
| 2010/0001985 A1* | 1/2010 | Chen et al. | 345/214 |
| 2010/0039418 A1* | 2/2010 | Chen et al. | 345/208 |
| 2010/0156954 A1 | 6/2010 | Kim et al. | |
| 2011/0069090 A1 | 3/2011 | Lee et al. | |
| 2011/0170027 A1* | 7/2011 | Nakanishi et al. | 349/33 |
| 2012/0033148 A1* | 2/2012 | Yang et al. | 349/39 |
| 2013/0021390 A1* | 1/2013 | Inada | 345/690 |

FOREIGN PATENT DOCUMENTS

| | | |
|---|---|---|
| TW | 200825509 | 6/2008 |
| WO | WO 2011125899 A1 * | 10/2011 |

\* cited by examiner

| R1 | R2 | R1 | R2 | R1 |
|----|----|----|----|----|
| R2 | R1 | R2 | R1 | R2 |
| R1 | R2 | R1 | R2 | R1 |
| R2 | R1 | R2 | R1 | R2 |
| R1 | R2 | R1 | R2 | R1 |

FIG. 11

| R1 | R2 | R1 | R2 | R1 |
|----|----|----|----|----|
| R2 | R1 | R2 | R1 | R2 |
| R1 | R2 | R1 | R2 | R1 |
| R2 | R1 | R2 | R1 | R2 |
| R1 | R2 | R1 | R2 | R1 |

FIG. 12

| R1 | R2 | R1 | R2 | R1 |
|----|----|----|----|----|
| R2 | R1 | R2 | R1 | R2 |
| R1 | R2 | R1 | R2 | R1 |
| R2 | R1 | R2 | R1 | R2 |
| R1 | R2 | R1 | R2 | R1 |

FIG. 13

DISPLAY PANEL AND METHOD OF DRIVING THE SAME

CROSS-REFERENCE TO RELATED APPLICATION

This application claims the priority benefit of Taiwan application serial no. 100141427, filed on Nov. 14, 2011. The entirety of the above-mentioned patent application is hereby incorporated by reference herein and made a part of this specification.

BACKGROUND OF THE INVENTION

1. Field of the Invention

The present invention relates to a display panel and a method of driving the same. More particularly, the present invention relates to a liquid crystal display panel and a method of driving the same.

2. Description of Related Art

Recently, a display apparatus is required to have the characteristics of wide viewing angles when displaying images, so as to comply with the demand that a plurality of users simultaneously watch the images displayed on the same display apparatus. Nevertheless, on certain conditions, such as writing down business information or inputting personal account number and password into an ATM machine, the characteristics of wide viewing angles of the display apparatus may cause the reveal of users' personal information. Accordingly, the display apparatus is required to have the privacy protecting design, so as to prevent others from spying on the highly confidential data.

At present, a privacy protecting design is proposed and achieved by additionally attaching an optical film on a display panel. Since the additionally optical film is required, it is not convenient in usage and the display panel is not easily switched between a privacy protecting mode and a non-privacy protecting mode.

SUMMARY OF THE INVENTION

Accordingly, the present invention is directed to a display panel and a method of driving the same capable of resolving the problems presented in the conventional display panels having the privacy protecting design.

A display panel including a pixel array is provided. The pixel array includes N scan lines, M data lines, and a plurality of first pixel units and a plurality of second pixel units electrically connected to the scan lines and the data lines. When an image is displayed with a wide-viewing angle mode, a first scanning procedure is performed to sequentially scan a first scan line of the scan lines to a Nth scan line of the scan lines in order. When the image is displayed with a narrow-viewing angle mode, a second scanning procedure is performed to sequentially scan the Nth scan line of the scan lines to the first scan line of the scan lines in order.

A display panel comprising a pixel array is provided. The pixel array comprises a plurality of scan lines and a plurality of data lines on a substrate and a plurality of first pixel units and a plurality of second pixel units electrically connected to the scan lines and the data lines. Each of the first pixel units and each of the second pixel units respectively comprise an active device, a main pixel electrode, a sub pixel electrode, a switching device, a first capacitor electrode line, a second capacitor electrode line, and a conductive line. The active device is electrically connected to one of the data lines and one of the scan lines. The main pixel electrode is electrically connected to the active device. The sub pixel electrode is electrically connected to the active device. The switching device is electrically connected to the sub pixel electrode and another one of the scan lines which is adjacent to the scan line electrically connected to the active device. The first capacitor electrode line is disposed under the main pixel electrode. The second capacitor electrode line is disposed under the sub pixel electrode. The conductive line is electrically connected to the switching device and the sub pixel electrode.

In light of the foregoing, the display panel can be switched between the narrow viewing angle mode and the wide viewing angle mode through changing the order of the scanning procedure. Comparing with the conventional display panels having the privacy protecting design, the display panel of the present invention can be switched between the narrow viewing angle mode and the wide viewing angle mode easily.

In order to make the aforementioned and other features and advantages of the present invention more comprehensible, several embodiments accompanied with figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

FIG. 11 is a schematic diagram showing an image on a display panel when driven by a narrow viewing angle mode.

FIG. 12 and FIG. 13 are schematic diagrams respectively showing an image on a display panel when driven by a narrow viewing angle mode.

DESCRIPTION OF EMBODIMENTS

Display Panel

Figure 1:
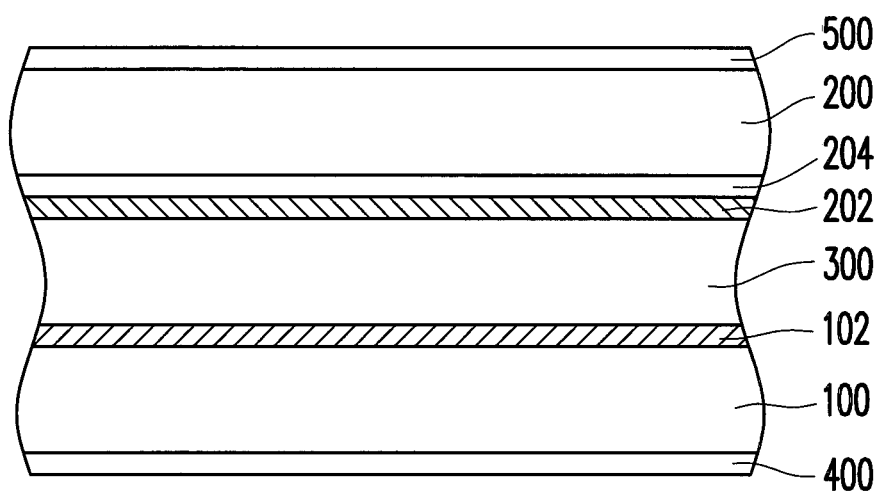
FIG. 1 is a schematic cross-sectional diagram showing a display panel according to an embodiment of the present invention.
Figure 2:
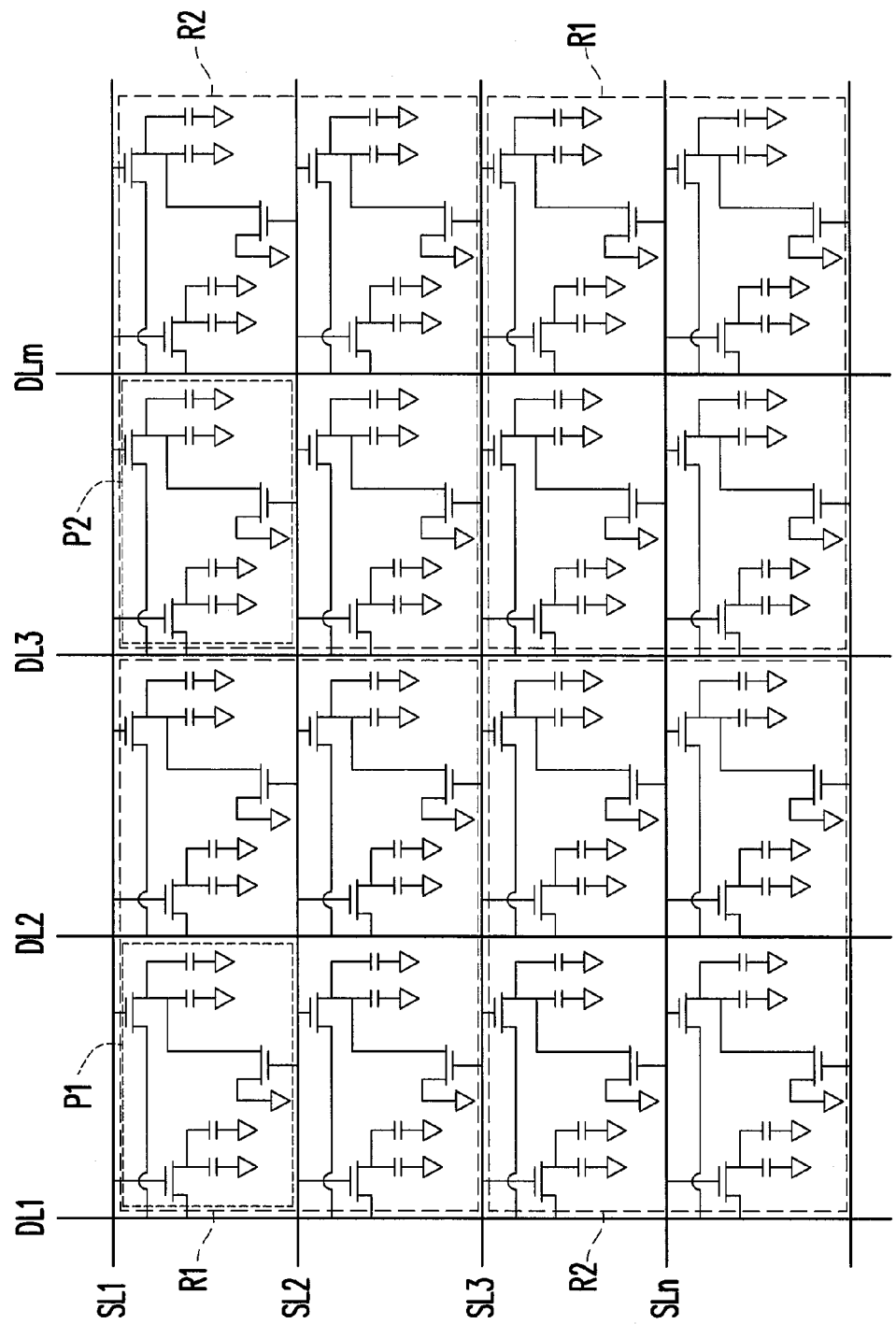
FIG. 2 is a schematic circuit diagram of a display panel according to an embodiment of the present invention.
Figure 3:
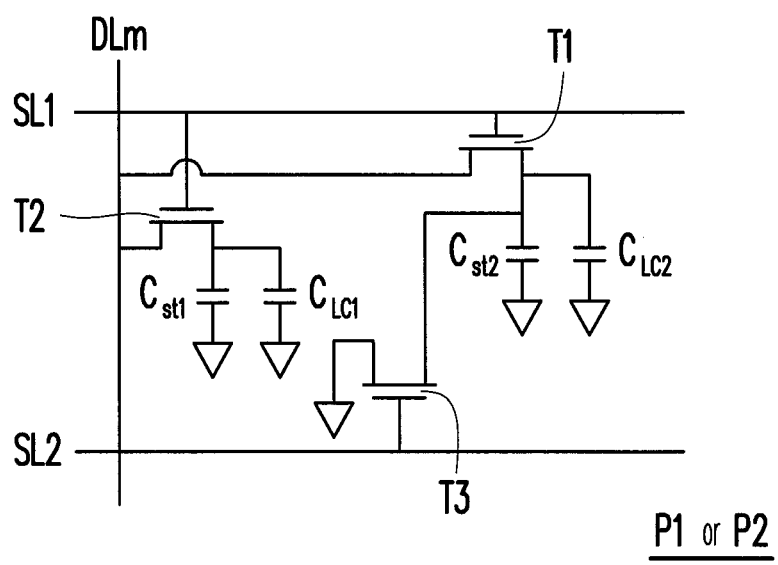
FIG. 3 is a schematic circuit diagram of a pixel unit of the display panel in FIG. 2.

FIG. 1 is a schematic cross-sectional diagram showing a display panel according to an embodiment of the present invention. FIG. 2 is a schematic circuit diagram of a display panel according to an embodiment of the present invention. FIG. 3 is a schematic circuit diagram of a pixel unit of the display panel in FIG. 2. Referring to FIG. 1, FIG. 2 and FIG. 3, the display panel comprises a substrate 100, a pixel array 102, a display medium 300, a substrate 200, an electrode film 202, a color filter array 204, and polarizers 400, 500.

The substrate 100 and the substrate 200 are disposed opposite to each other and are mainly used for carrying devices and films. The substrate 100 and the substrate 200 can be made of glass, quartz, an organic polymer, an opaque/reflective material (such as a conductive material, metal, wafer, ceramics, or any other appropriate material), or any other appropriate material.

The pixel array 102 is disposed on the substrate 100. The pixel array 102 is described in details subsequently.

The electrode film 202 and the color filter array 204 are disposed on the substrate 200. The electrode film 202 comprises a transparent material. The color filter array 204 comprises a plurality of color filter patterns, such as red filter patterns, green filter patterns and blue filter patterns. In the embodiment, the substrate 200 includes the electrode film 202 and the color filter array 204 thereon, which is not limited by the disclosure. According to another embodiment, the substrate 200 may have no electrode film thereon, and the color filter array 204 may be disposed on the substrate 100.

The display medium 300 is sandwiched between the substrate 100 and the substrate 200. The display medium 300 includes liquid crystal molecules.

The polarizers 400, 500 are disposed on a surface of the substrate 100 and on a surface of the substrate 200. In the embodiment, the polarizers 400, 500 respectively have an absorption axis or a polarization direction. An image can be displayed by the display panel through associating the polarization direction of the polarizers 400, 500 with the twist of the display medium 300.

The pixel array 102 includes a plurality of scan lines SL1~SLn, a plurality of data lines DL1~DLm, and a plurality of first pixel units P1 and a plurality of second pixel units P2 electrically connected to the scan lines SL1~SLn and the data lines DL1~DLm, shown in FIG. 2.

According to the embodiment, the substrate 100 includes a plurality of first regions R1 and a plurality of second regions R2, the first pixel units P1 are disposed in the first regions R1, and the second pixel units P2 are disposed in the second regions R2. Namely, each of the first regions R1 has a plurality of first pixel units P1 therein and each of the second regions R2 has a plurality of second pixel units P2 therein. The number of the first pixel units P1 in each of the first regions R1 and the number of the second pixel units P2 in each of the second regions R2 are not limited in the invention. In consideration of privacy protecting function, the number of the first pixel units P1 in each of the first regions R1 is 2 to 30, and the number of the second pixel units P2 in each of the second regions R2 is 2 to 30. In addition, the first regions R1 and the second regions R2 are arranged in a chessboard-shaped manner. The first pixel units P1 and the second pixel units P2 are arranged on the substrate 100 according to the arrangement of the first regions R1 and the second regions R2 which are arranged in the chessboard-shaped manner.

As shown in FIG. 2 and FIG. 3, each of the first pixel units P1 and each of the second pixel units P2 respectively comprise active devices T1, T2, a switching device T3, and capacitors Cst1, Cst2. The active devices T1, T2 are electrically connected to one of the scan lines (such as the scan line SL1) and one of the data lines (such as the data line DLm). The capacitor Cst1 is electrically connected to the active device T2, and the capacitor Cst2 is electrically connected to the active device T1. The switching device T3 is electrically connected to the capacitor Cst2 and one of the scan lines (such as the scan line SL2) which is adjacent to the scan line SL1. The pixel array 102 on the substrate 100, the electrode film 202 on the electrode 200 and the display medium 300 form liquid crystal capacitors, and therefore each of the first pixel unit P1 and the second pixel unit P2 further includes liquid crystal capacitors Clc1, CLc2.

Figure 4A:
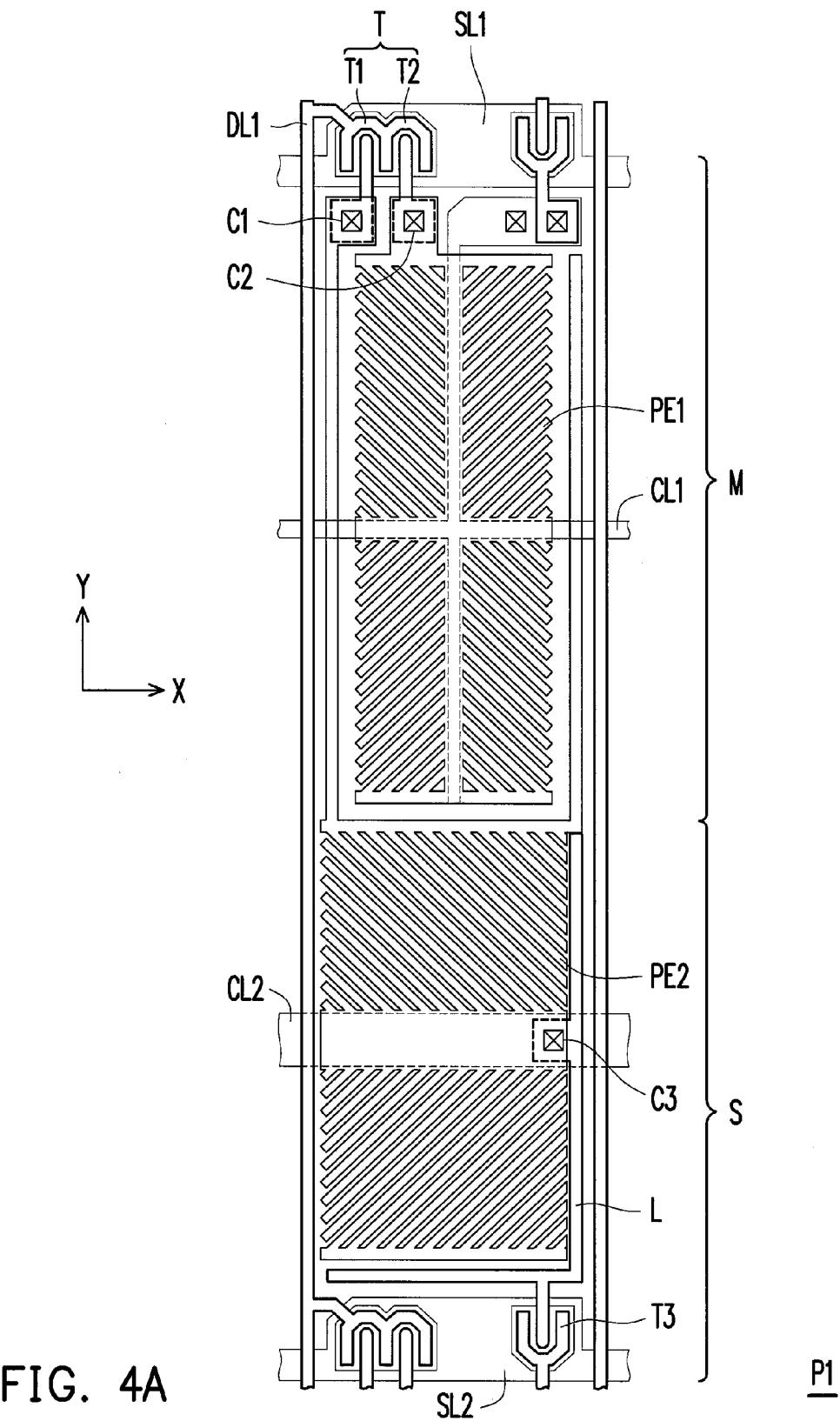
FIG. 4A is a schematic top view diagram showing a first pixel unit of the display panel according to an embodiment of the present invention.
Figure 4B:
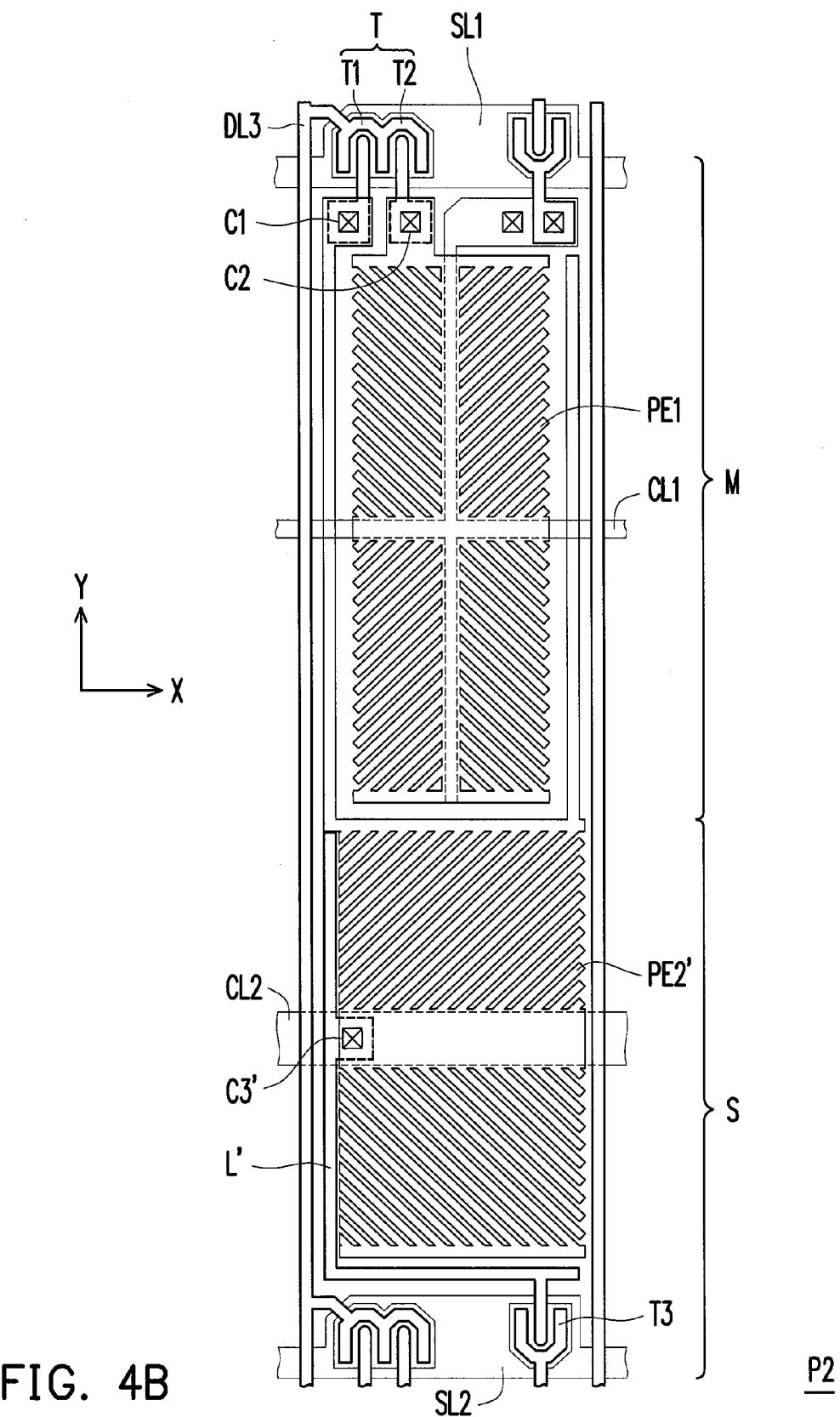
FIG. 4B is a schematic top view diagram showing a second pixel unit of the display panel according to an embodiment of the present invention.

In the embodiment, the layouts of the first pixel unit P1 and the second pixel unit P2 are respectively shown in FIG. 4A and FIG. 4B.

Referring to FIG. 4A, the first pixel unit P1 includes an active device T (including T1, T2), a main pixel electrode PE1, a sub pixel electrode PE2, a switching device T3, a first capacitor electrode line CL1, a second capacitor electrode line CL2, and a conductive line L. Herein, the first pixel unit P1 has a main region M and a sub region S.

The active device T includes the active device T1 and the active device T2, the active device T1 is electrically connected to one of the scan lines (such as the scan line SL1) and one of the data lines (such as the data line DL1), and the active device T2 is electrically connected to one of the scan lines (such as the scan line SL1) and one of the data lines (such as the data line DL1). The active device T1 and the active device T2 may be bottom-gate thin film transistors or top-gate thin film transistors, and each of the active device T1 and the active device T2 includes a gate, a channel, a source, and a drain. In the embodiment, the active device T1 and the active device T2 have a common gate and a common source.

The main pixel electrode PE1 is in the main region M and electrically connected to the active device T2. The main pixel electrode PE1 is electrically connected to the active device T2 through the contact window C2. The main pixel electrode PE1 may be a transparent pixel electrode, a reflective pixel electrode or a transflective pixel electrode. The transparent pixel electrode comprises a metal oxide, such as indium tin oxide (ITO), indium zinc oxide (IZO), aluminum tin oxide (ATO), aluminum zinc oxide (AZO), indium-gallium-zinc oxide (IGZO) or any other suitable metal oxide material, or at least two of materials above stacked to each other. The reflective pixel electrode comprises a metal material having high reflectivity. In the embodiment, the main pixel electrode PE1 has a cross-shaped main part and branch parts connected to the main part. The cross-shaped main part extends along X direction and Y direction. The branch parts extend along four directions, and included angles are between the four directions and X direction (or Y direction). The included angles are acute angles (45 degree, for example) or obtuse angles (135 degree for example).

The sub pixel electrode PE2 is in the sub region S and electrically connected to the active device T1. The sub pixel electrode PE2 is electrically connected to the active device T1 through the contact window C1. The sub pixel electrode PE2 may be a transparent pixel electrode, a reflective pixel electrode or a transflective pixel electrode. The transparent pixel electrode comprises a metal oxide, such as indium tin oxide (ITO), indium zinc oxide (IZO), aluminum tin oxide (ATO), aluminum zinc oxide (AZO), indium-gallium-zinc oxide (IGZO) or any other suitable metal oxide material, or at least two of materials above stacked to each other. The reflective pixel electrode comprises a metal material having high reflectivity. In the embodiment, the sub pixel electrode PE2 has an oblique strip structure extending along two directions. The extending directions of the oblique strip structure of the sub pixel electrode PE2 are not parallel to the absorption axis of the polarizer (polarizer 400 or polarizer 500 shown in FIG. 1). For instance, if the direction of the absorption axis of the polarizer 400 (or the polarizer 500) is X direction (or Y direction), included angles between the two extending directions of the oblique strip structure of the sub pixel electrode PE2 and X direction (or Y direction) are acute angles (45 degree, for example) or obtuse angles (135 degree, for example).

The switching device T3 is electrically connected to another one of the scan lines (such as the scan line SL2) which is adjacent to the scan line SL1, and the switching device T3 is further electrically connected to the sub pixel electrode PE2. The switch device T3 can be a bottom-gate thin film transistor or a top-gate thin film transistor which includes a gate, a channel, a source, and a drain. The gate of the switching device T3 is electrically connected to the another one of the scan lines (such as the scan line SL2), the drain of the switching device T3 is electrically connected to the sub pixel electrode PE2, and the source of the switching device T3 is electrically connected to a common voltage (such as a ground voltage). In the embodiment, the source of the switching device T3 is electrically connected to a capacitor electrode line of a next pixel unit through a contact window so as to electrically connect to the common voltage (such as the ground voltage).

The conductive line L is disposed under the sub pixel electrode PE2. The conductive line L is electrically connected to the switching device T3 and the sub pixel electrode PE2. In the embodiment, the sub pixel electrode PE2 is electrically connected to the drain of the switching device T3 through a contact window C3 and the conductive line L.

The first capacitor electrode line CL1 is disposed under the main pixel electrode PE1, and an overlapping region between the first capacitor electrode line CL1 and the main pixel electrode PE1 forms the capacitor Cst1 (as shown in FIG. 3). The first capacitor electrode line CL1 is electrically connected to the common voltage (such as the ground voltage). In the embodiment, the first capacitor electrode line CL1 under the main pixel electrode PE1 has a cross-shaped pattern, which is not limited in the invention.

The second capacitor electrode line CL2 is disposed under the sub pixel electrode PE2, and an overlapping region between the second capacitor electrode line CL2 and the sub pixel electrode PE2 forms the capacitor Cst2 (as shown in FIG. 3). The second capacitor electrode line CL2 is electrically connected to the common voltage (such as the ground voltage).

Referring to FIG. 4B, the second pixel unit P2 includes an active device T (including T1, T2), a main pixel electrode PE1, a sub pixel electrode PE2', a switching device T3, a first capacitor electrode line CL1, a second capacitor electrode line CL2, and a conductive line L'. Herein, the second pixel unit P2 is similar to the first pixel unit P1, and the same components indicated in the second pixel unit P2 and the first pixel unit P1 are denoted by the same numerals and are not repeated herein.

The material and the electrical connection for the sub pixel electrode PE2' in the second pixel unit P2 are the same to those for the sub pixel electrode PE2 in the first pixel unit P1, and the sub pixel electrode PE2' also has an oblique strip structure extending along two directions. Similarly, the extending directions of the oblique strip structure of the sub pixel electrode PE2' are not parallel to the absorption axis of at least one of the polarizer (polarizer 400 or polarizer 500 shown in FIG. 1). For instance, if the direction of the absorption axis of the polarizer 400 (or the polarizer 500) is X direction (or Y direction), included angles between the two extending directions of the oblique strip structure of the sub pixel electrode PE2' and X direction (or Y direction) are acute angles (45 degree, for example) or obtuse angles (135 degree, for example). In the embodiment, the difference between the sub pixel electrode PE2' in the second pixel unit P2 and the sub pixel electrode PE2 in the first pixel unit P1 lies in that the extending directions of the oblique strip structure of the sub pixel electrode PE2' are different from the extending directions of the oblique strip structure of the sub pixel electrode PE2 in the first pixel unit P1. In the embodiment, the sub pixel electrode PE2' of the second pixel unit P2 and the sub pixel electrode PE2 of the first pixel unit P1 arranged into a "*" shape. Therefore, the oblique strip structure of the sub pixel electrode PE2' in the second pixel unit P2 and the oblique strip structure of the sub pixel electrode PE2 in the first pixel unit P1 extend along four directions.

In addition, the conductive line L' in the second pixel unit P2 is also electrically connected to the switching device T3 and the sub pixel electrode PE2'. However, the pattern of the conductive line L' in the second pixel unit P2 is not the same to the pattern of the conductive line L in the first pixel unit P1. In the embodiment, the conductive line L of the first pixel unit P1 and the conductive line L' of the second pixel unit P2 are arranged in a mirror-symmetrical manner.

Figure 5A:
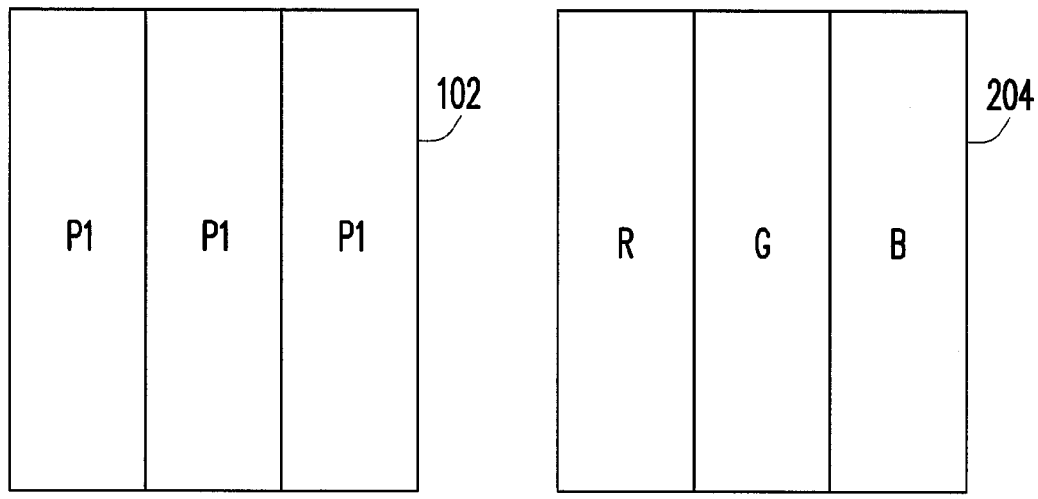
FIG. 5A is a schematic top view diagram showing first pixel units of a pixel array and a color filter array in a display panel according to an embodiment of the present invention.
Figure 5B:
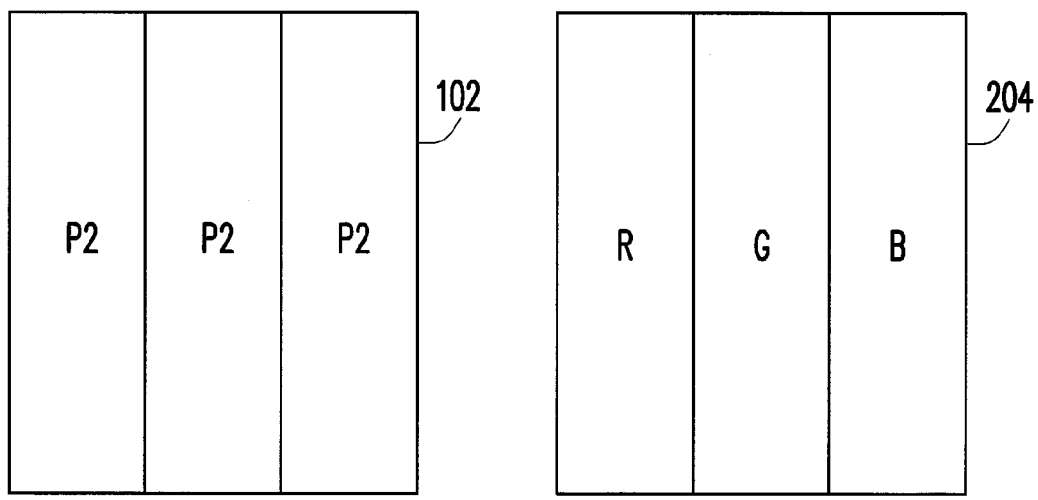
FIG. 5B is a schematic top view diagram showing second pixel units of a pixel array and a color filter array in a display panel according to an embodiment of the present invention.

The first pixel units P1 shown in FIG. 4A and the second pixel units P2 shown in FIG. 4B form the pixel array 102 of the display panel (shown in FIG. 1), and the relation between the pixel array 102 and the color filter array 204 (including the color filter patterns) disposed opposite to the pixel array 102 is as shown in FIG. 5A and FIG. 5B.

Referring to FIG. 5A, if the arrangement of the first pixel units P1 of the pixel array 102 in the first region R1 is as shown in the left side of the drawing, the arrangement of the color filter patterns of the color filter array 204 is shown in a right side of the drawing. Namely, one color filter pattern is disposed above each of the first pixel units P1. As shown in FIG. 5A, a red filter pattern R, a green filter pattern G and a blue filter pattern B are respectively disposed above three of the first pixel units P1.

Referring to FIG. 5B, if the arrangement of the second pixel units P2 of the pixel array 102 in the second region R2 is as shown in the left side of the drawing, the arrangement of the color filter patterns of the color filter array 204 is shown in a right side of the drawing. Namely, one color filter pattern is disposed above each of the second pixel units P2. As shown in FIG. 5B, a red filter pattern R, a green filter pattern G and a blue filter pattern B are disposed above three of the second pixel units P2.

In the embodiment, the first pixel unit P1 and the second pixel unit P2 of the pixel array may be as shown in FIG. 4A and FIG. 4B, and the color filter array 204 corresponding to the pixel array may be as shown in FIG. 5A and FIG. 5B. However, the invention does not limit to the embodiment.

According to other embodiments, the first pixel unit P1 and the second pixel unit P2 of the pixel array 102 may also have other layouts or structures.

Figure 6A:
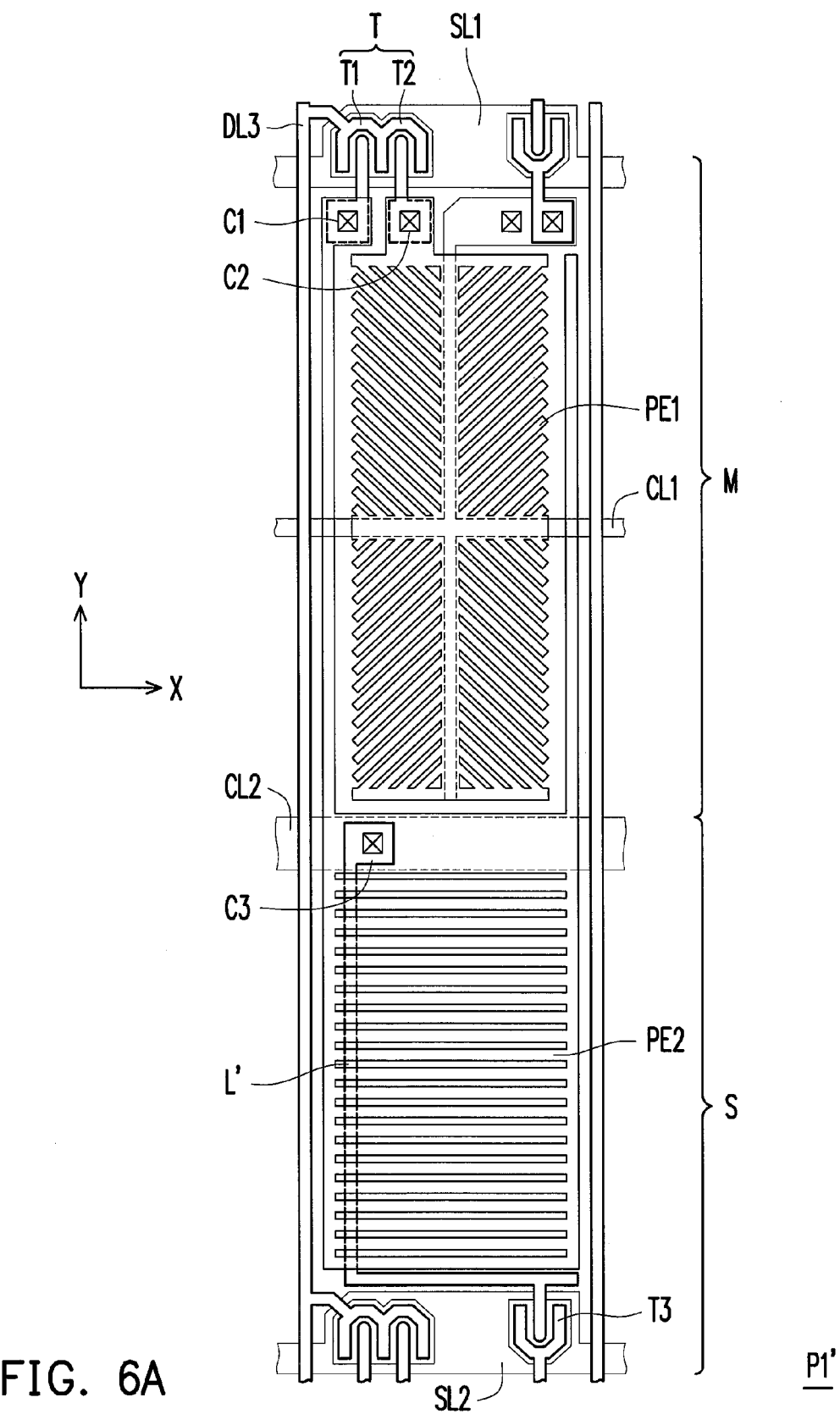
FIG. 6A is a schematic top view diagram showing a first pixel unit of a display panel according to an embodiment of the present invention.
Figure 6B:
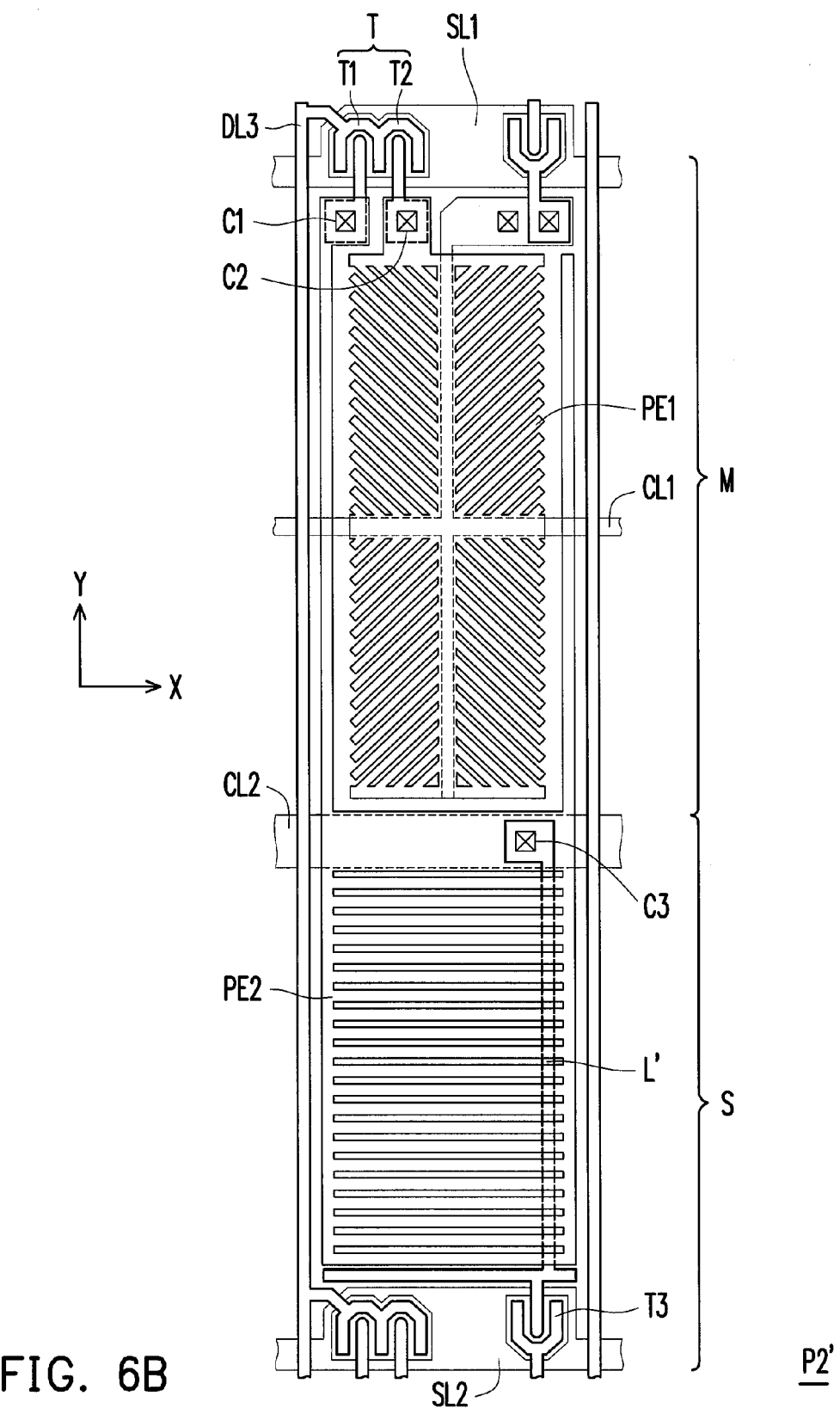
FIG. 6B is a schematic top view diagram showing a second pixel unit of a display panel according to an embodiment of the present invention.

FIG. 6A is a schematic top view diagram showing a first pixel unit of the display panel according to an embodiment of the present invention. FIG. 6B is a schematic top view diagram showing a second pixel unit of the display panel according to an embodiment of the present invention.

Referring to FIG. 6A, the first pixel unit P1' depicted in FIG. 6A is similar to the first pixel unit P1 depicted in FIG. 4A, and the same components indicated in FIG. 6A and FIG. 4A are denoted by the same numerals and are not repeated herein. In the embodiment of FIG. 6A, the sub pixel electrode PE2 of the first pixel unit P1' has a finger-shaped structure, and an extension direction of the finger-shaped structure is parallel with the absorption axis of the polarizer (polarizer 400 or polarizer 500 shown in FIG. 1). For instance, if the direction of the absorption axis of the polarizer 400 (or the polarizer 500) is X direction (or Y direction), the extension direction of the finger-shaped structure of the sub pixel electrode PE2 is also X direction (or Y direction).

Referring to FIG. 6B, the second pixel unit P2' depicted in FIG. 6B is similar to the second pixel unit P2 depicted in FIG. 4B, and the same components indicated in FIG. 6B and FIG. 4B are denoted by the same numerals and are not repeated herein. In the embodiment of FIG. 6B, the sub pixel electrode PE2 of the second pixel unit P2' has a finger-shaped structure, and an extension direction of the finger-shaped structure is parallel with the absorption axis of the polarizer (polarizer 400 or polarizer 500 shown in FIG. 1). For instance, if the direction of the absorption axis of the polarizer 400 (or the polarizer 500) is X direction (or Y direction), the extension direction of the finger-shaped structure of the sub pixel electrode PE2 is also X direction (or Y direction).

In addition, the pattern of the conductive line L' in the second pixel unit P2' shown in FIG. 6B is not the same as that of the conductive line L' in the first pixel unit P1' shown in FIG. 6A. In the embodiment, the conductive line L' of the first pixel unit P1' and the conductive line L' of the second pixel unit P2' are arranged in a mirror-symmetrical manner.

Figure 7A:
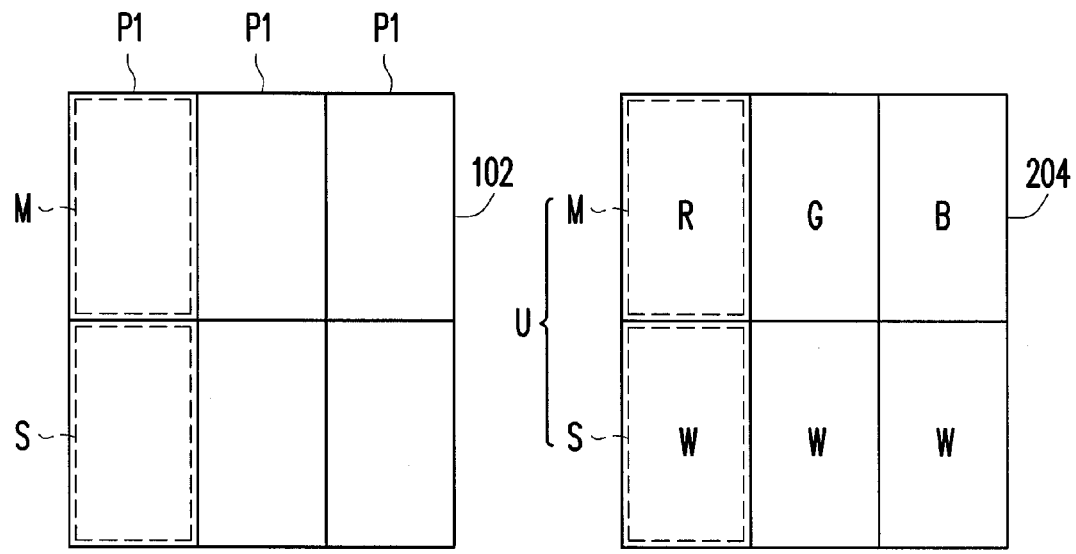
FIG. 7A is a schematic top view diagram showing first pixel units of a pixel array and a color filter array in a display panel according to an embodiment of the present invention.
Figure 7B:
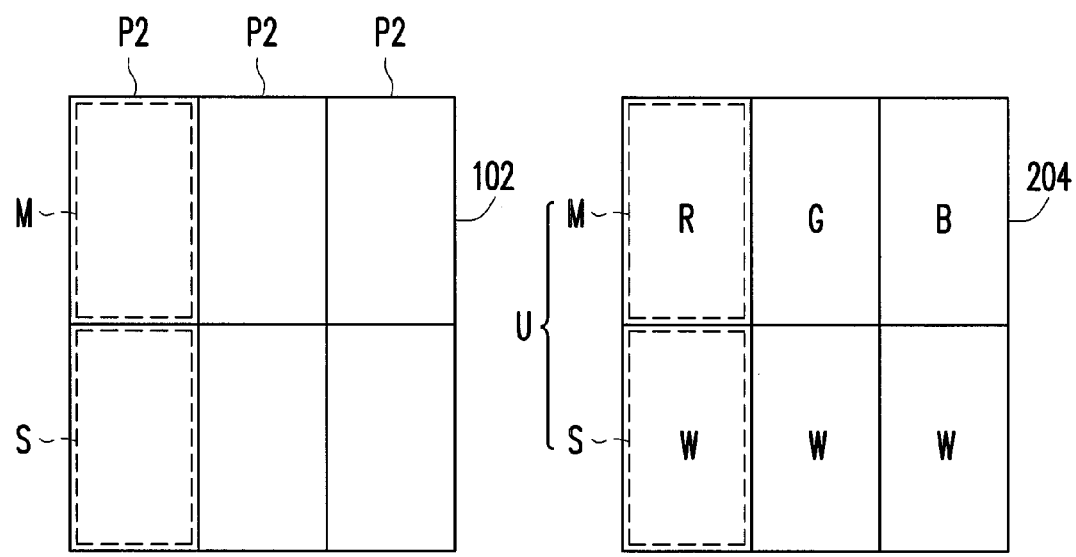
FIG. 7B is a schematic top view diagram showing second pixel units of a pixel array and a color filter array in a display panel according to an embodiment of the present invention.

The first pixel units P1' shown in FIG. 6A and the second pixel units P2' shown in FIG. 6B form the pixel array 102 of the display panel (shown in FIG. 1), and the relation between the pixel array 102 and the color filter array 204 (including the color filter patterns) disposed opposite to the pixel array 102 is shown in FIG. 7A and FIG. 7B.

Referring to FIG. 7A, if the arrangement of the first pixel units P1 of the pixel array 102 in the first region R1 is as shown in the left side of the drawing, the arrangement of the color filter patterns of the color filter array 204 is shown in a right side of the drawing. For detail, the first pixel units P1 has the main region M in which the main pixel electrode PE1 is disposed and the sub region S in which the sub pixel electrode PE2 is disposed. The color filter pattern of the color filter array 204 corresponding to the pixel array 102 also has a main region M corresponding to the main region M of the first pixel units P1' and a sub region S corresponding to the sub region S of the first pixel units P1', and the main region M and the sub region S form a unit region U. In the embodiment, a red filter pattern R, a green filter pattern G or a blue filter pattern B is disposed in the main region M, and a white filter pattern W is disposed in the sub region S. Sub regions S with white filter pattern W are arranged in a row, for example.

Referring to FIG. 7B, if the arrangement of the second pixel units P2 of the pixel array 102 in the second region R2 is as shown in the left side of the drawing, the arrangement of the color filter patterns of the color filter array 204 is shown in a right side of the drawing. For detail, the second pixel units P2 has the main region M in which the main pixel electrode PE1 is disposed and the sub region S in which the sub pixel electrode PE2 is disposed. The color filter pattern of the color filter array 204 corresponding to the pixel array 102 also has a main region M corresponding to the main region M of the first pixel units P2 and a sub region S corresponding to the sub region S of the first pixel units P2, and the main region M and the sub region S form a unit region U. In the embodiment, a red filter pattern R, a green filter pattern G or a blue filter pattern B is disposed in the main region M, and a white filter pattern W is disposed in the sub region S.

Figure 8A:
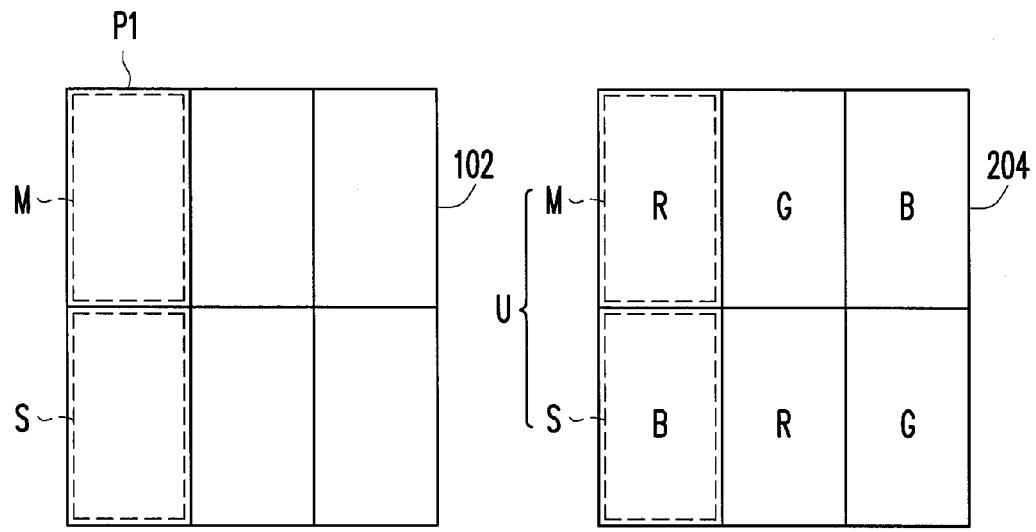
FIG. 8A is a schematic top view diagram showing first pixel units of a pixel array and a color filter array in a display panel according to an embodiment of the present invention.
Figure 8B:
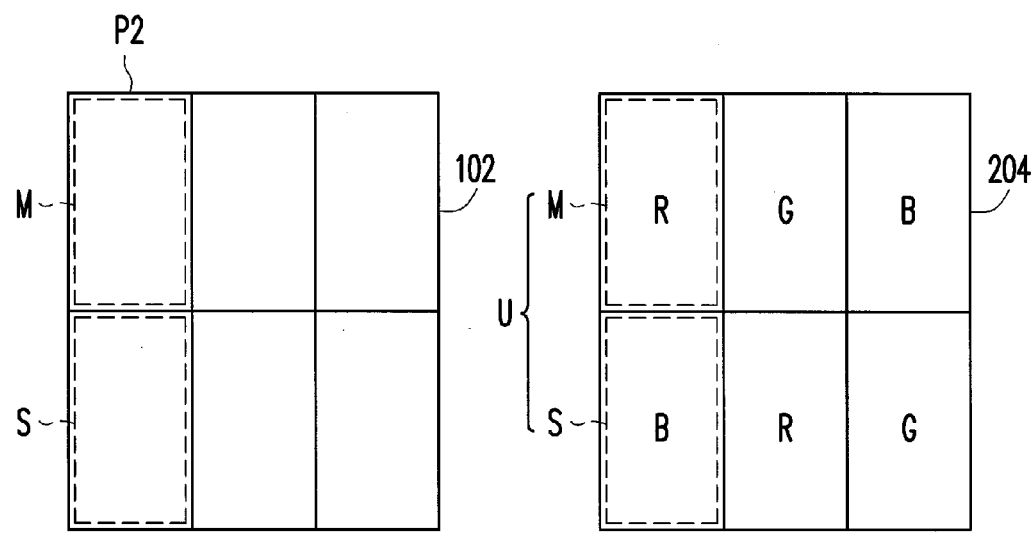
FIG. 8B is a schematic top view diagram showing second pixel units of a pixel array and a color filter array in a display panel according to an embodiment of the present invention.

The relation between the pixel array 102 having the first pixel unit P1' shown in FIG. 6A and the second pixel unit P2' shown in FIG. 6B and the color filter array 204 (including the color filter patterns) may also be shown in FIG. 8A and FIG. 8B.

Referring to FIG. 8A, if the arrangement of the first pixel units P1 of the pixel array 102 in the first region R1 is as shown in the left side of the drawing, the arrangement of the color filter patterns of the color filter array 204 is shown in a right side of the drawing. For detail, the first pixel units P1 has the main region M in which the main pixel electrode PE1 is disposed and the sub region S in which the sub pixel electrode PE2 is disposed. The color filter pattern of the color filter array 204 corresponding to the pixel array 102 also has a main region M a corresponding to the main region M of the first pixel units P1 and a sub region S corresponding to the sub region S of the first pixel units P1, and the main region M and the sub region S form a unit region U. In the embodiment, a red filter pattern R, a green filter pattern G or a blue filter pattern B is disposed in the main region M, and a color filter pattern having a color different from the color of the color filter pattern in the main region M is disposed in the sub region S. For instance, if a red filter pattern R is disposed in the main region M, a blue filter pattern B is disposed in the sub region S.

Referring to FIG. 8B, if the arrangement of the second pixel units P2 of the pixel array 102 in the second region R2 is as shown in the left side of the drawing, the arrangement of the color filter patterns of the color filter array 204 is shown in a right side of the drawing. For detail, the second pixel units P2 has the main region M in which the main pixel electrode PE1 is disposed and the sub region S in which the sub pixel electrode PE2 is disposed. The color filter pattern of the color filter array 204 corresponding to the pixel array 102 also has a main region M corresponding to the main region M of the first pixel units P2 and a sub region S corresponding to the sub region S of the first pixel units P2, and the main region M and the sub region S form a unit region U. In the embodiment, a red filter pattern R, a green filter pattern G or a blue filter pattern B is disposed in the main region M of the second pixel units P2, and a color filter pattern having a color different from the color of the color filter pattern in the main region M is disposed in the sub region S. For instance, if a red filter pattern R is disposed in the main region M, a blue filter pattern B is disposed in the sub region S.

Driving Method

Figure 9:
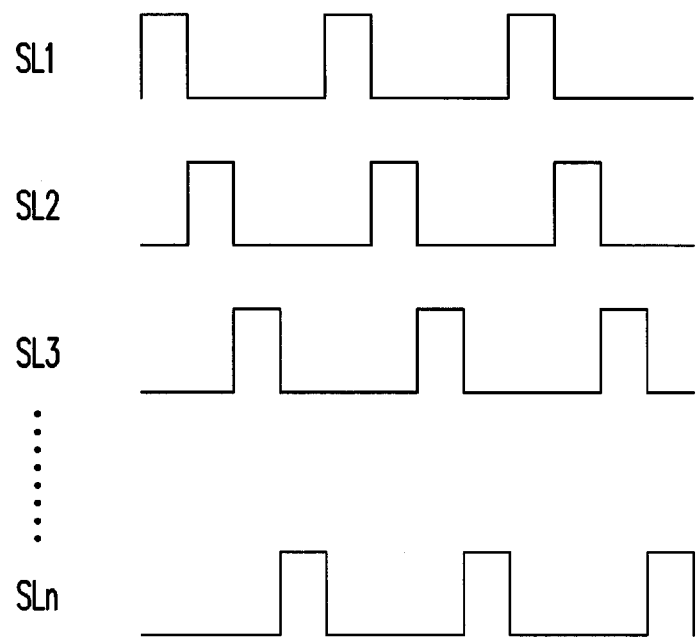
FIG. 9 is a schematic diagram showing a method of driving a display panel with a wide viewing angle mode.
Figure 10:
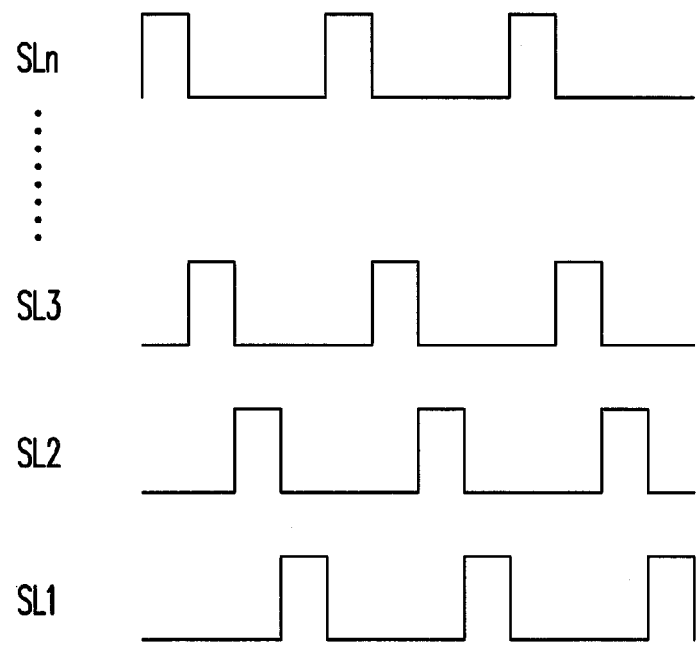
FIG. 10 is a schematic diagram showing a method of driving a display panel with a narrow viewing angle mode.

The display panels described in the above embodiments are driven by a driving method as described in the following. FIG. 9 is a schematic diagram showing a method of driving a display panel with a wide viewing angle mode. FIG. 10 is a schematic diagram showing a method of driving a display panel with a narrow viewing angle mode.

Referring to FIG. 2 and FIG. 9, when an image is displayed with a wide-viewing angle mode (also referred to a normal display mode), a first scanning procedure is performed to sequentially scan the first scan line SL1 to the Nth scan line SLn in order. Namely, a driving signal for the scan lines is started to scan from the first scan line SL1, the second scan line SL2, the third scan line SL3, . . . , to the Nth scan line SLn in order.

If the configurations of the first pixel unit and the second pixel unit are as shown in FIG. 4A and FIG. 4B and when the image is displayed with the wide-viewing angle mode (normal display mode), the image is mainly displayed by the main regions M of the first pixel unit P1 and the second pixel unit P2. At this moment, the sub regions S of the first pixel unit P1 and the second pixel unit P2 do not work. Since the sub pixel electrode PE2 in the sub region S is electrically connected to the switching device T3 and one end of the switching device T3 is electrically connected to the common voltage (such as the ground voltage), the sub pixel electrode PE2 is grounded through the switching device T3, such that the sub regions S of the first pixel unit P1 and the second pixel unit P2 do not work.

Referring to FIG. 2 and FIG. 10, when the image is displayed with a narrow-viewing angle mode (also referred to a privacy protecting mode), the second scanning procedure is performed to sequentially scan the Nth scan line SLn to the first scan line SL1 in order. Namely, the driving signal for the scan lines is started to scan from the Nth scan line SLn, . . . , the third scan line SL3, the second scan line SL2 to the first scan line SL1 in order.

If the configurations of the first pixel unit and the second pixel unit are as shown in FIG. 4A and FIG. 4B and the color filter array is as shown in FIG. 5A and FIG. 5B, and when the image is displayed with the narrow-viewing angle mode (privacy protecting mode), both of the main regions M and the sub regions S of the first pixel unit P1 and the second pixel unit P2 act to display the image. At this time, even the sub pixel electrode PE2 in the sub region S is electrically connected to the switching device T3, the switching device T3 is earlier turned on in a previous time period owing to the driving signal for the scan lines is scanned from the Nth scan line SLn, and when the driving signal is applied to the corresponding scan line, the switching device T3 has been turned off. Therefore, both of the main regions M and the sub regions S of the first pixel unit P1 and the second pixel unit P2 act to display the image when the image is displayed with the narrow-viewing angle mode (privacy protecting mode).

In the embodiment, the main regions M and the sub regions S of the first pixel unit P1 and the second pixel unit P2 act to display the image, and the sub pixel electrode PE2 and the conductive line L in the sub region S of the first pixel unit P1 and the sub pixel electrode PE2' and the conductive line L' in the sub region S of the second pixel unit P2 are arranged in a mirror-symmetrical manner. Therefore, when the image is displayed with the narrow-viewing angle mode (privacy protecting mode), a viewer directly locating on the front of the display panel (viewing angle is 0) may watch an image as shown in FIG. 11. Namely, the brightness of the first regions R1 (having first pixel units P1) and the brightness of the second regions R2 (having second pixel units P2) on the display panel are similar or identical, and thus the viewer may watch a clear image.

Because the sub pixel electrode PE2 and the conductive line L in the sub region S of the first pixel unit P1 and the sub pixel electrode PE2' and the conductive line L' in the sub region S of the second pixel unit P2 are arranged in a mirror-symmetrical manner, the liquid crystal molecules may tilt in different directions. When the viewer watches the image on the display panel with a large viewing angle (viewing angle is 45 degree or 135 degree), the brightness in horizontal viewing angles is different. For instance, when the viewer watches the image on the display panel with a viewing angle of 45 degree, the image watched by the viewer is as shown in FIG. 12. Namely, the brightness of the first regions R1 (having first pixel units P1) is relatively low and the brightness of the second regions R2 (having second pixel units P2) is relatively high so as to achieve image interference. Namely, since the brightness of the first regions R1 is different from the brightness of the second regions R2, the viewer does not watch a clear image.

When the viewer watches the image on the display panel with a viewing angle of 135 degree, the image watched by the viewer is as shown in FIG. 13. Namely, the brightness of the first regions R1 (having first pixel units P1) is relatively high and the brightness of the second regions R2 (having second pixel units P2) is relatively low so as to achieve image interference. Namely, since the brightness of the first regions R1 is different from the brightness of the second regions R2, the viewer does not watch a clear image.

The driving method for the display panel having the first and second pixel units (FIG. 4A and FIG. 4B) is described as above. The driving method for the display panel having the first and second pixel units (FIG. 6A and FIG. 6B) is described as following.

Referring to FIG. 2 and FIG. 9, when an image is displayed with a wide-viewing angle mode (normal display mode), a first scanning procedure is performed to sequentially scan the first scan line SL1 to the Nth scan line SLn in order. Namely, a driving signal for the scan lines is started to scan from the first scan line SL1, the second scan line SL2, the third scan line SL3, . . . , to the Nth scan line SLn in order.

If the configurations of the first pixel unit and the second pixel unit are as shown in FIG. 6A and FIG. 6B and when the image is displayed with the wide-viewing angle mode (normal display mode), the image is mainly displayed by the main regions M of the first pixel unit P1 and the second pixel unit P2. At this moment, the sub regions S of the first pixel unit P1 and the second pixel unit P2 do not work.

Referring to FIG. 2 and FIG. 10, when the image is displayed with a narrow-viewing angle mode (privacy protecting mode), the second scanning procedure is performed to sequentially scan the Nth scan line SLn to the first scan line SL1 in order. Namely, the driving signal for the scan lines is started to scan from the Nth scan line SLn, . . . , the third scan line SL3, the second scan line SL2 to the first scan line SL1 in order.

If the configurations of the first pixel unit and the second pixel unit are as shown in FIG. 6A and FIG. 6B and the color filter array is as shown in FIG. 5A and FIG. 5B, and when the image is displayed with the narrow-viewing angle mode (privacy protecting mode), both of the main regions M and the sub regions S of the first pixel unit P1 and the second pixel unit P2 act to display the image.

In the embodiment, the sub pixel electrodes PE2 in the sub regions S of the first and second pixel units P1, P2 respectively have a finger-shaped structure, and the extension direction of the finger-shaped structure is parallel with the absorption axis of the polarizer. Therefore, when a viewer directly locates on the front of the display panel (viewing angle is 0), the viewer may watch an image as shown in FIG. 11 owing to light can not pass though the sub regions S. Namely, the brightness of the first regions R1 (having first pixel units P1) and the brightness of the second regions R2 (having second pixel units P2) on the display panel are similar or identical, and thus the viewer may watch a clear image.

Because the conductive line L in the sub region S of the first pixel unit P1 and the conductive line L' in the sub region S the second pixel unit P2 are arranged in a mirror-symmetrical manner, the liquid crystal molecules may tilt in different directions. When the viewer watches the image on the display panel with a large viewing angle (viewing angle is 45 degree or 135 degree), the brightness in horizontal viewing angles is different. For instance, when the viewer watches the image on the display panel with a viewing angle of 45 degree, the image watched by the viewer is as shown in FIG. 12. Namely, the brightness of the first regions R1 (having first pixel units P1) is relatively low and the brightness of the second regions R2 (having second pixel units P2) is relatively high so as to achieve image interference. Since the brightness of the first regions R1 is different from the brightness of the second regions R2, the viewer can not watch a clear image. When the viewer watches the image on the display panel with a viewing angle of 135 degree, the image watched by the viewer is as shown in FIG. 13. Namely, the brightness of the first regions R1 (having first pixel units P1) is relatively high and the brightness of the second regions R2 (having second pixel units P2) is relatively low so as to achieve image interference. Since the brightness of the first regions R1 is different from the brightness of the second regions R2, the viewer can not watch a clear image.

It is noted that if the configurations of the first pixel unit and the second pixel unit are as shown in FIG. 6A and FIG. 6B, and the color filer array is as shown in FIG. 7A and FIG. 7B in which the white filter patterns are disposed corresponding to the sub region S. In this embodiment, because the sub regions S have higher transmittance, the brightness difference between the first region R1 and the second region R2 is higher, and the privacy protecting effect is better.

In addition, if the configurations of the first pixel unit and the second pixel unit are as shown in FIG. 6A and FIG. 6B, and the color filer array is as shown in FIG. 8A and FIG. 8B in which the color of the color filter pattern in the main region M is different from the color of the color filter pattern in the sub region S. In the embodiment, because the color of the color filter pattern in the main region M is different from the color of the color filter pattern in the sub region S in the same pixel unit, the brightness difference between the first region R1 and the second region R2 is higher through color interference, such that the privacy protecting effect is better.

In light of the foregoing, the display panel can be switched between the narrow viewing angle mode (normal display mode) and the wide viewing angle mode (privacy protecting mode) through changing the order of the scanning procedure. Comparing with the conventional display panels having the privacy protecting design, the display panel of the present invention can be switched between the narrow viewing angle mode and the wide viewing angle mode easily.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of driving a display panel, comprising:
   providing a display panel comprising a pixel array, the pixel array comprising N scan lines, M data lines, and a plurality of first pixel units and a plurality of second pixel units electrically connected to the scan lines and the data lines, wherein;
   each of the first pixel units and the second pixel units comprises:
   an active device, electrically connected to one of the data lines and one of the scan lines;
   a main pixel electrode, electrically connected to the active device;
   a sub pixel electrode, electrically connected to the active device;
   a switching device, electrically connected to the sub pixel electrode and another one of the scan lines, wherein the another one of the scan lines is adjacent to the scan line electrically connected to the active device;
   a first capacitor electrode line, disposed under the main pixel electrode;
   a second capacitor electrode line, located under the sub pixel electrode; and
   a conductive line, electrically connected to the switching device and the sub pixel electrode, wherein the conductive line has a straight portion substantially extending along an edge profile of the sub pixel electrode; and the straight portion of the conductive line of one of the first pixel units and that of one of the second pixel units are arranged in a mirror-symmetrical manner with respect to one of the scan lines or one of the data lines so that each of the first pixel units having a structure different from that of each of the second pixel units; and
   the pixel array includes a plurality of first regions and a plurality of second regions, the first regions alternate with the second regions along each of a plurality of rows and each of a plurality of columns, the first pixel units are disposed in the first regions, and the second pixel units are disposed in the second regions so that a group of the first pixel units are located between two groups of the second pixel units along each of the rows and each of the columns;
   performing a first scanning procedure to sequentially scan a first scan line of the scan lines to a Nth scan line of the scan lines in order when an image is displayed with a wide-viewing angle mode; and
   performing a second scanning procedure to sequentially scan the Nth scan line of the scan lines to the first scan line of the scan lines in order when the image is displayed with a narrow-viewing angle mode.

2. The method as claimed in claim 1, wherein the first regions and the second regions are arranged in a checkered pattern.

3. The method as claimed in claim 1, wherein the number of the first pixel units in each of the first regions is 2 to 30, and the number of the second pixel units in each of the second regions is 2 to 30.

4. The method as claimed in claim 1, wherein the display panel further comprises at least one polarizer, a sub pixel electrode has a comb-shaped structure, and an extension direction of the comb-shaped structure is parallel with an absorption axis of the polarizer.

5. The method as claimed in claim 4, wherein the display panel further comprises a color filter array comprising a plurality of unit regions, and each of the unit regions corresponds to one of the first pixel units or one of the second pixel units, wherein
   each of the unit regions has a main region corresponding to the main pixel electrode and a sub region corresponding to the sub pixel electrode, and
   the main region and the sub region respectively have a color filter pattern therein, and the color of the color filter pattern in the main region is different from the color of the color filter pattern in the sub region.

6. The method as claimed in claim 4, wherein the display panel further comprises a color filter array comprising a plurality of unit regions, and each of the unit regions corresponds to one of the first pixel units or one of the second pixel units, wherein
each of the unit regions has a main region corresponding to the main pixel electrode and a sub region corresponding to the sub pixel electrode, and
the main region has a red, green or blue filter pattern therein, and the sub region has a white filter pattern therein.

7. The method as claimed in claim 1, wherein the display panel further comprises at least one polarizer, the sub pixel electrode of the first pixel unit has a first oblique strip structure, the sub pixel electrode of the second pixel unit has a second oblique strip structure, wherein extending directions of the first oblique strip structure and the second oblique strip structure are not parallel to an absorption axis of the polarizer, and wherein the first oblique strip structure and the second oblique strip structure are arranged in a mirror-symmetrical manner.

8. A display panel comprising a pixel array, the pixel array comprising:
a plurality of scan lines and a plurality of data lines on a substrate; and
a plurality of first pixel units and a plurality of second pixel units electrically connected to the scan lines and the data lines, wherein each of the first pixel units and the second pixel units comprises:
an active device, electrically connected to one of the data lines and one of the scan lines;
a main pixel electrode, electrically connected to the active device;
a sub pixel electrode, electrically connected to the active device;
a switching device, electrically connected to the sub pixel electrode and another one of the scan lines, wherein the another one of the scan lines is adjacent to the scan line electrically connected to the active device;
a first capacitor electrode line, disposed under the main pixel electrode;
a second capacitor electrode line, disposed under the sub pixel electrode; and
a conductive line, electrically connected to the switching device and the sub pixel electrode, wherein the conductive line has a straight portion substantially extending along an edge profile of the sub pixel electrode, and the straight portion of the conductive line of one of the first pixel units and that of one of the second pixel units are arranged in a mirror-symmetrical manner with respect to one of the scan lines or one of the data lines.

9. The display panel as claimed in claim 8, wherein the substrate includes a plurality of first regions and a plurality of second regions, the first pixel units are disposed in the first regions, and the second pixel units are disposed in the second regions.

10. The display panel as claimed in claim 9, wherein the first regions and the second regions are arranged in a checkered pattern.

11. The display panel as claimed in claim 9, wherein the number of the first pixel units in each of the first regions is 2 to 30, and the number of the second pixel units in each of the second regions is 2 to 30.

12. The display panel as claimed in claim 8, further comprising at least one polarizer, the sub pixel electrode of the first pixel unit and the sub pixel electrode of the second pixel unit respectively having a comb-shaped structure, wherein an extension direction of the comb-shaped structure is parallel with an absorption axis of the polarizer.

13. The display panel as claimed in claim 12, further comprising a color filter array including a plurality of unit regions, each of the unit regions corresponding to one of the first pixel units or one of the second pixel units, wherein
each of the unit regions has a main region corresponding to the main pixel electrode and a sub region corresponding to the sub pixel electrode, and
the main region and the sub region respectively have a color filter pattern therein, and the color of the color filter pattern in the main region is different from the color of the color filter pattern in the sub region.

14. The display panel as claimed in claim 12, further comprising a color filter array including a plurality of unit regions, each of the unit regions corresponding to one of the first pixel units or one of the second pixel units, wherein
each of the unit region has a main region corresponding to the main pixel electrode and a sub region corresponding to the sub pixel electrode, and
the main region has a red, green or blue filter pattern therein, and the sub region has a white filter pattern therein.

15. The display panel as claimed in claim 8, further comprising at least one polarizer, the sub pixel electrode of the first pixel unit having a first oblique strip structure, the sub pixel electrode of the second pixel unit having a second oblique strip structure, wherein extending directions of the first oblique strip structure and the second oblique strip structure are not parallel to an absorption axis of the polarizer, and the first oblique strip structure and the second oblique strip structure are arranged in a mirror-symmetrical manner.

16. The method as claimed in claim 1, wherein the second capacitor electrode line is disposed between the main pixel electrode and the sub pixel electrode.

17. The display panel as claimed in claim 8, wherein the second capacitor electrode line is disposed between the main pixel electrode and the sub pixel electrode.

18. The method as claimed in claim 5, wherein in the step of performing the first scanning procedure, the image is mainly displayed by the main regions and the sub regions do not work.

19. The method as claimed in claim 6, wherein in the step of performing the first scanning procedure, the image is mainly displayed by the main regions and the sub regions do not work.

* * * * *